(12) United States Patent
Blasczak et al.

(10) Patent No.: US 8,903,201 B2
(45) Date of Patent: Dec. 2, 2014

(54) METHOD AND APPARATUS FOR ENHANCED DOCUMENT CAPTURE

(75) Inventors: Matthew D. Blasczak, Shirley, NY (US); Alan J. Epshteyn, Miller Place, NY (US); Mehaboob Kumbalakkuzhiyil, Ronkonkoma, NY (US); Bruno Vande Vyvre, Westhampton, NY (US); Michelle X. Wang, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 202 days.

(21) Appl. No.: 13/316,726

(22) Filed: Dec. 12, 2011

(65) Prior Publication Data
US 2013/0148914 A1 Jun. 13, 2013

(51) Int. Cl.
*G06K 9/22* (2006.01)
(52) U.S. Cl.
USPC ........................................................ 382/313
(58) Field of Classification Search
USPC ............... 382/294, 312, 313, 317; 348/231.9; 358/1.9, 497
See application file for complete search history.

(56) References Cited

U.S. PATENT DOCUMENTS

| 5,140,650 | A | 8/1992 | Casey et al. |
| 7,172,125 | B2 | 2/2007 | Wang et al. |
| 7,586,655 | B1 | 9/2009 | Uhlik et al. |
| 8,083,147 | B2 | 12/2011 | Aker et al. |
| 2001/0016084 | A1 | 8/2001 | Pollard et al. |
| 2004/0169873 | A1 | 9/2004 | Nagarajan |
| 2008/0116278 | A1 | 5/2008 | Epshteyn |
| 2009/0267895 | A1 | 10/2009 | Bunch |
| 2011/0193944 | A1 | 8/2011 | Lian et al. |
| 2011/0243477 | A1 | 10/2011 | Minerich |
| 2011/0285874 | A1 | 11/2011 | Showering et al. |
| 2012/0104099 | A1 | 5/2012 | He et al. |

FOREIGN PATENT DOCUMENTS

WO 2007075071 A1 7/2007

OTHER PUBLICATIONS

International Search Report and Written Opinion mailed Apr. 29, 2013 in counterpart application PCT/US2012/067896.

*Primary Examiner* — Duy M Dang (57) ABSTRACT

A system and method for processing an image of a document is disclosed. The method includes receiving at least one predetermined document parameter of the document. An image of the document is previewed on a display using a camera. The display provides a visual indication of a defect in the image based on the preview. A processor proposes a procedure to minimize the defect in the image. A user adjusts the camera in response to the proposal. The processor processes the image of the document.

22 Claims, 8 Drawing Sheets

METHOD AND APPARATUS FOR ENHANCED DOCUMENT CAPTURE

TECHNICAL FIELD

The present disclosure relates generally to minimizing imaging defects for improved document capture.

BACKGROUND

Successful document capture using a hand held equipment requires that the document being imaged must be imaged with a minimum of image capture errors. Image capture errors are any errors which would preclude the document from being properly captured, or that would otherwise degrade the visible quality of the image to be captured.

SUMMARY

In one aspect, the invention is embodied in a method for processing an image of a document. The method includes receiving at least one predetermined document parameter of the document. The image of the document is previewed on a display using a camera. A visual indication of a defect in the image is provided based on the preview. A procedure is proposed to minimize the defect in the image. The device including the integrated camera is adjusted in response to the proposal. The image of the document is then processed.

In some embodiments, the proposed procedure can be one or more of tilting the camera, translating the camera, refocusing the camera, rotating the camera, changing the distance between the camera and the document, adjusting an illumination, adjusting a contrast of the camera, adjusting an exposure of the camera, and removing a visible obstruction from a field of view of the camera.

In some embodiments, the defect can be one or more of image skew, image out-of-focus, image translated, image rotated, image obstructed, image improperly illuminated, and bounding box misaligned.

The method can also include capturing the image of the document. In one embodiment, the processing includes performing optical character recognition on the image. In one embodiment, the processing includes decoding a barcode present in the image. The method can also include viewing the image on a display.

In one embodiment, the procedure includes overlaying a bounding box over the image displayed on the display and adjusting the camera until a desired portion of the document aligns with the bounding box. In another embodiment, the procedure includes overlaying a plurality of bounding boxes on the image displayed on the display and adjusting the camera until a corresponding plurality of portions of the document align with the plurality of bounding boxes.

In one embodiment, the procedure includes overlaying a directional arrow on the image to indicate to the user which direction to move the camera. In one embodiment, the method also includes providing an audio indication of the defect.

In another aspect, the invention is embodied in a mobile device for processing an image of a document. The mobile device includes a memory for storing at least one predetermined document parameter of the document. A camera provides an image of a document. A processor coupled to the camera previews the image of the document. A display provides a visual indication of a defect in the image based on the preview of the image. The processor proposes a procedure to minimize the defect in the image and processes the image of the document upon a user adjusting the camera in response to the proposal.

In some embodiments, the procedure can include one or more of tilting the camera, translating the camera, refocusing the camera, rotating the camera, changing the distance between the camera and the document, adjusting an illumination, adjusting a contrast of the camera, adjusting an exposure of the camera, and removing a visible obstruction from a field of view of the camera.

In some embodiments, the defect can be one or more of image skew, image out-of-focus, image translated, image rotated, image obstructed, image improperly illuminated, and bounding box misaligned.

The processor can process the image by performing optical character recognition on the image. The processor can process the image by decoding a barcode present in the image. In one embodiment, the processor captures the image of the document. In one embodiment, the display displays the image.

In one embodiment, the procedure can include overlaying a bounding box over the image displayed on the display and adjusting the camera until a desired portion of the document aligns with the bounding box.

In one embodiment, the procedure can include overlaying a plurality of bounding boxes on the image displayed on the display and adjusting the camera until a corresponding plurality of portions of the document align with the plurality of bounding boxes.

In one embodiment, the procedure includes overlaying a directional arrow on the image to indicate to the user which direction to move the camera. The mobile device can also include a speaker for providing an audio indication of the defect.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description.

For the purposes of conciseness, many conventional techniques and principles related to imaging technology, need not, and are not, described in detail herein. For example, details regarding conventional solid-state imaging systems are not described in detail. A typical solid-state imaging system includes an imager having a one or two-dimensional array of cells or photosensors, which correspond to image elements or pixels in a field of view of the imager, and a focusing lens assembly for capturing light from the image and projecting the captured light onto the imager. Such an imager may include a one or two-dimensional charge coupled device (CCD) or a complementary metal oxide semiconductor (CMOS) device, and is analogous to the imager used in a digital consumer camera to capture images. The focusing lens assembly includes optical elements for capturing the light over a range of working distances in which the image can be captured.

The imaging system further typically includes an illuminator to illuminate the image during its reading with illumination light emitted from an illumination light source and directed to the image for reflection and scattering as return light therefrom. The illumination light source may be located within and/or externally of the system, and typically comprises one or more light emitting diodes (LEDs). To assist an operator in aiming, the imaging system is often equipped with an aiming assembly having an aiming laser for generating a laser beam, and aiming optics for generating a visible aiming pattern, such as a "crosshair" pattern, from the laser beam. The operator trains the aiming pattern on the target to be imaged during an aiming mode prior to capturing. The system yet further includes electronic circuitry for processing electrical signals generated by the imager and indicative of the return light captured by the array, and a microprocessor for processing and decoding the electrical signals to process each captured image.

In one embodiment, the invention is embodied in a method for processing an image of a document. The method includes receiving a predetermined document parameter of the document. An image of the document is previewed using a camera. A visual indication of a defect in the image is provided based on the preview. A procedure to minimize the defect in the image is proposed. The camera is adjusted in response to the proposal. The image of the document is then processed.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Furthermore, the connecting lines shown in the various figures contained herein are intended to represent example functional relationships and/or physical couplings between the various elements. Many alternative or additional functional relationships or physical connections may be present in a practical embodiment.

Technologies and concepts discussed herein relate to systems and methods of enhancing imager-based document capture using hand held equipment.

Figure 1:
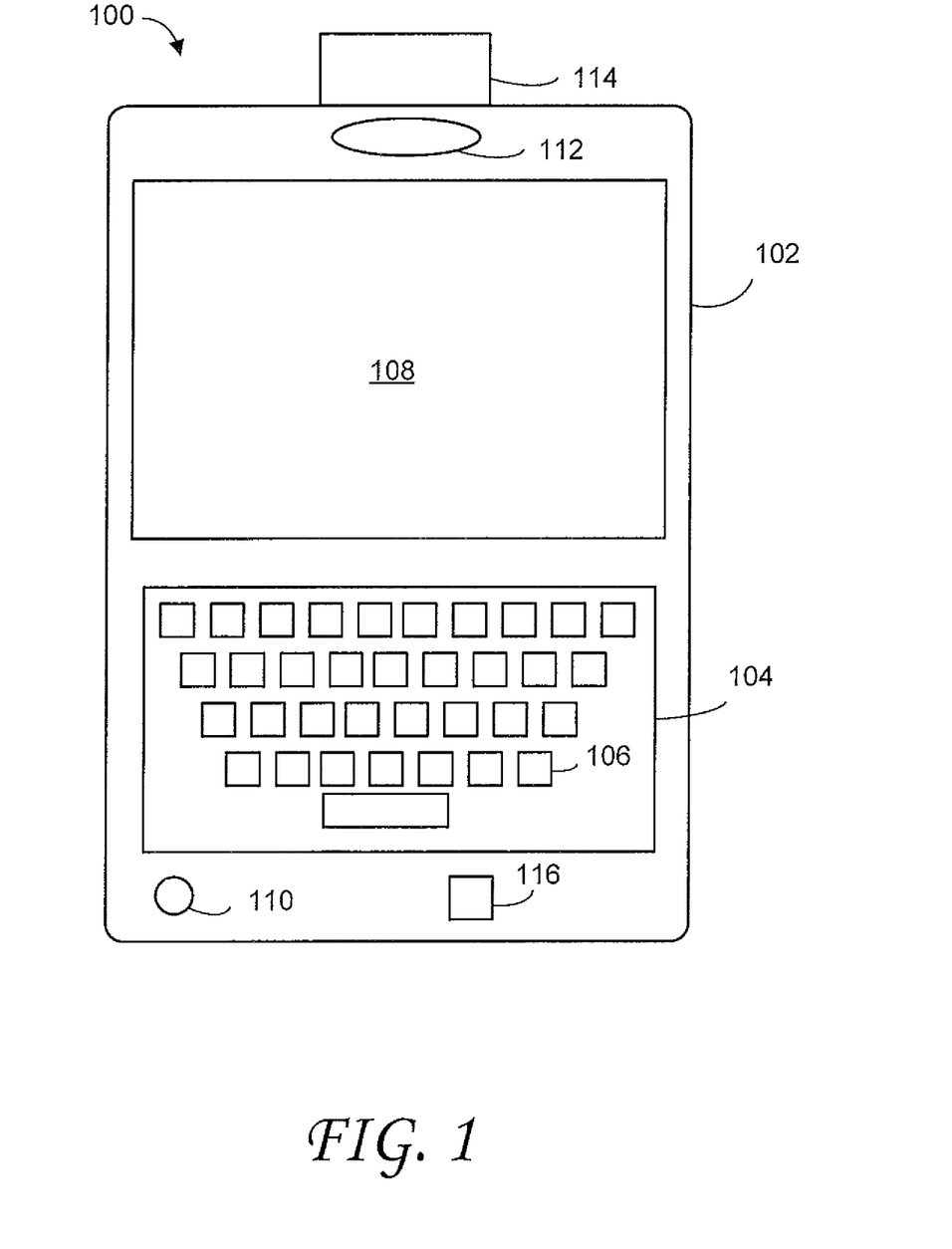
FIG. 1 is a front view of a mobile computing device according to one embodiment of the invention.

FIG. 1 is a front view of a mobile computing device 100 according to one embodiment of the invention. The mobile computing device 100 is one example of a data capture device having camera according to the invention. The mobile computing device 100 includes a housing 102. The housing 102 contains electronic components, including internal communication components that allow the mobile device to wirelessly communicate with other devices and processing circuitry as further described with relation to FIG. 2. The housing 102 also contains I/O devices such as a keyboard 104 with alpha-numeric keys 106, a display 108 (e.g., LED, OELD) that displays information about the device 100, soft and/or hard keys, touch screen, jog wheel, a microphone 110, and a speaker 112. In some embodiments, the device 100 includes more or less than all of the I/O devices shown in FIG. 1.

The mobile computing device 100 can also include a camera-based data capture device 114, such as a charged coupled device (CCD) or complementary metal-oxide-semiconductor (CMOS) sensor array, for capturing an image located in a field of view of the camera-based data capture device 114.

The display 108 can be a liquid crystal display (LCD) display that can present the image or other information to the user. For example, in one embodiment, the user can preview the image on the display 108 and the system can also simultaneously overlay information about the image on the display 108.

The mobile device 100 also contains, among other components, a motion sensor 116. The mobile device 100 can also include a transceiver (not shown) including transmitter circuitry and receiver circuitry, an antenna, other I/O devices (not shown), one or more communication interfaces (not shown), and an optional removable storage (not shown).

The motion sensor 116 can be any sensor that can detect an orientation and/or position of the mobile device 100, such as an accelerometer. The motion sensor 116 is coupled to a controller and generates a sensor signal indicating the orientation and/or position of the mobile device 100.

The controller can include one or more microprocessors, microcontrollers, DSPs, state machines, logic circuitry, or any other device or devices that process information based on operational or programming instructions. Such operational or programming instructions are preferably stored in a memory. The memory can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the controller has one or more of its functions performed by a state machine or logic circuitry, the memory containing the corresponding operational instructions may be embedded within the state machine or logic circuitry.

The mobile device can also include transmitter circuitry and receiver circuitry that enable the mobile computing device 100 to respectively transmit and receive communication signals. In this regard, the transmitter circuitry and the receiver circuitry include circuitry to enable wireless transmissions. The implementations of the transmitter circuitry and the receiver circuitry depend on the implementation of the mobile computing device 100 and the devices with which it is to communicate. For example, the transmitter and receiver circuitry can be implemented as part of the communication device hardware and software architecture in accordance with known techniques. One of ordinary skill in the art will recognize that most, if not all, of the functions of the transmitter or receiver circuitry can be implemented in a processor. In one embodiment, an antenna, such as a local area network (LAN) antenna is coupled to the transceiver.

Figure 2:
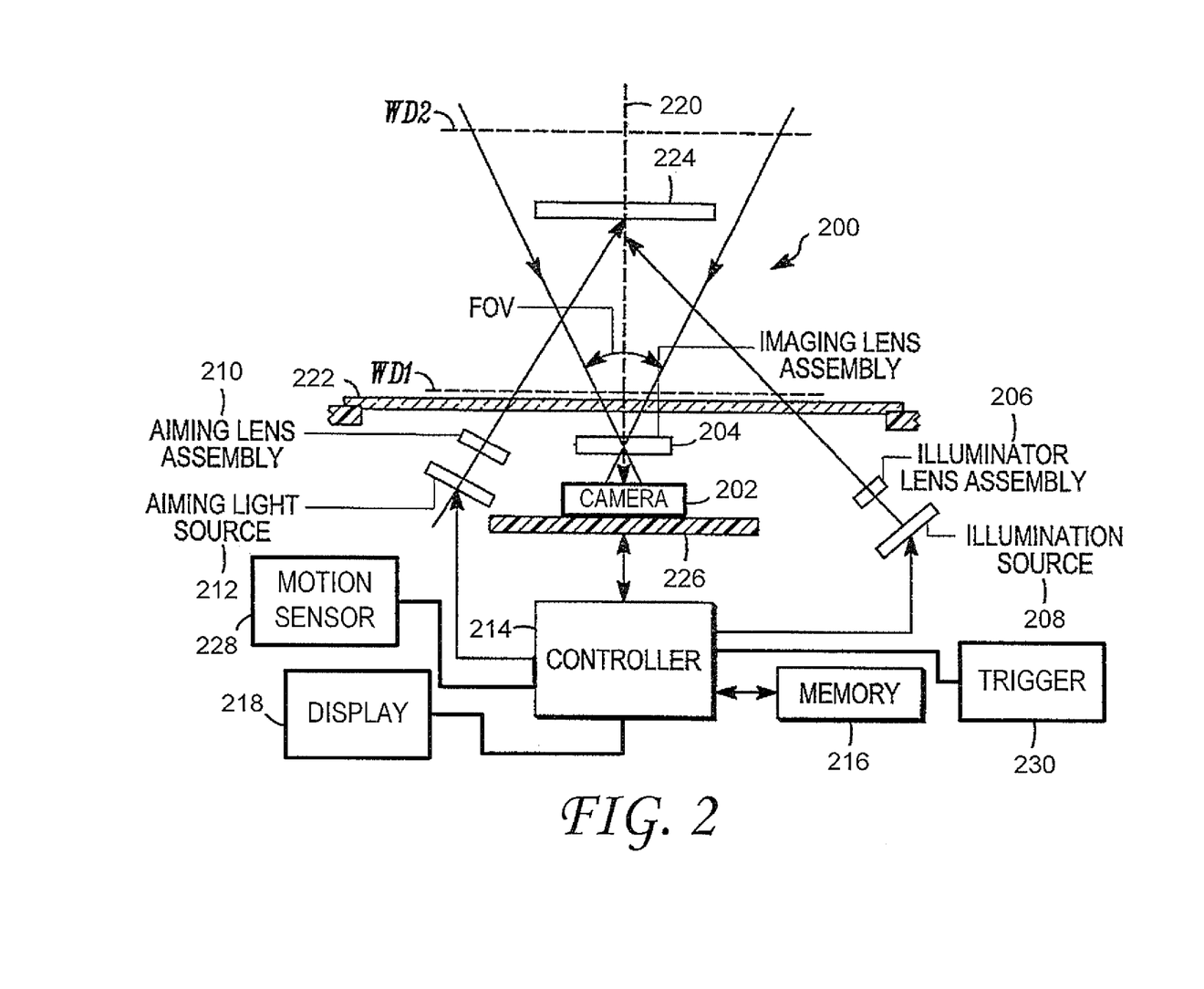
FIG. 2 is a schematic of an exemplary imager-based data capture device for use with the mobile device of FIG. 1.

FIG. 2 is a schematic of an exemplary imager-based data capture device 200 for use with the mobile device of FIG. 1. The imager-based data capture device 200 includes the following components: (1) a camera 202 which is a solid-state imaging component, positioned behind an imaging lens assembly 204; (2) an illuminating lens assembly 206 positioned in front of an illumination source 208; (3) an aiming lens assembly 210 positioned in front of an aiming light source 212; and (4) a controller 214. The controller 214 can be coupled to a memory 216. The memory 216 can be any combination of non-volatile or volatile memory. For example, the memory 216 can include a combination of random access memory (RAM), read only memory (ROM), flash memory, solid state memory, disk drive, or the like. The memory 216 can be used for storing software applications to be executed on the controller 214 or data received from the camera 202, for example.

The camera 202 is controlled by the controller 214. The controller 214 issues capture commands to the camera 202 via the memory 216. In one embodiment, the memory 216 is implemented within a field programmable gate array (FPGA), however the memory 216 may also be implemented in other devices. The camera 202 captures images and the memory 216 stores the images in a memory module. The memory module can store the image data prior to the controller 214 processing the image or displaying the image on the display 218, such as a liquid crystal display (LCD).

A typical camera captures thirty frames per second or one frame every thirty-three milliseconds. This is commonly referred to as the image capture cycle (i.e. the time required for the imager to expose the image and transmit the data to memory). Thus, the image capture cycle is thirty-three milliseconds, meaning that once every thirty-three milliseconds the camera exposes a new frame and sends the image to memory.

The camera 202 can be a CCD or a CMOS imaging device. The camera 202 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The camera 202 is operative to detect light captured by the imaging lens assembly 204 along an optical axis 220 through the window 222. Generally, the camera 202 and the imaging lens assembly 204 are designed to operate together for capturing light scattered or reflected from a document 224 as pixel data over a two-dimensional field of view (FOV).

In FIG. 2, the imaging lens assembly 204, the illuminating lens assembly 206, and the aiming lens assembly 210 are positioned behind the window 222. The camera 202 is mounted on a printed circuit board 226 in the imager-based data capture device 200.

The document 224 generally can be located anywhere in a working range of distances between a close-in working distance (WD1) and a far-out working distance (WD2). In one specific implementation, WD1 is about a few inches from the window 222, and WD2 is about a few feet from the window 222. The imager-based data capture device 200 can include a range finding system for measuring the distance between the document 224 and the imaging lens assembly 204. Additionally, the imager-based data capture device 200 can include an auto-focus system to enable a document 224 be more clearly imaged with the camera 202 based on the measured distance of the document 224. In some implementations of the auto-focus system, the focus distance of the imaging lens assembly 204 is adjusted based on the measured distance of the document 224. In some other implementations of the auto-focus system, the distance between the imaging lens assembly 204 and the camera 202 is adjusted based on the measured distance of the document 224.

The illuminating lens assembly 206 and the illumination source 208 are designed to operate together for generating an illuminating light towards the document 224 during an illumination time period. The illumination source 208 can include one or more light emitting diodes (LED). The illumination source 208 can also include a laser or other types of light sources. The aiming lens assembly 210 and the aiming light source 212 are designed to operate together for generating a visible aiming light pattern towards the document 224. Such an aiming pattern can be used by the operator to accurately aim the imager 200 at the document 224. The aiming light source 212 can include one or more light emitting diodes (LED). The aiming light source 212 can also include a laser or other types of light sources.

The controller 214 is operatively connected to the camera 202, the illumination source 208, and the aiming light source 212 for controlling the operation of these components. The controller 214 can also be used to control other devices in the imager-based data capture device 200. The controller 214 can include a microprocessor, for example. The imager-based data capture device 200 includes the memory 216 that can be accessible by the controller 214 for storing and retrieving images or storing executable software code for instructing the controller 214.

In some embodiments, the controller 214 also includes a decoder that can decode one or more barcodes that are within the field of view (FOV) of the imager-based data capture device 200. The barcode can be decoded by digitally processing a captured image of the barcode with a microprocessor.

The imager-based data capture device 200 is coupled to, among other components, the display 218, a motion sensor 228, and a trigger 230 of the mobile device 100 (FIG. 1). The imager-based data capture device 200 can also communicate with a transceiver (not shown) including transmitter circuitry and receiver circuitry, an antenna, other I/O devices (not shown), one or more communication interfaces (not shown), and an optional removable storage (not shown).

The trigger 230 is a control that is activated by a user during operation of the mobile device 100 to capture the document 224. As previously described, the display 218 can be a liquid crystal display (LCD) display that can present the image or other information to the user.

The motion sensor 228 can be any sensor that can detect an orientation and/or a position of the mobile device 100 and the imager-based data capture device 200, such as an accelerometer. The motion sensor 228 is coupled to the controller 214 and generates a sensor signal indicating the orientation and/or position of the mobile device 100 and the imager-based data capture device 200.

The controller 214 can include one or more microprocessors, microcontrollers, DSPs, state machines, logic circuitry, or any other device or devices that process information based on operational or programming instructions. Such operational or programming instructions are preferably stored in the memory 216. The memory 216 can be an IC memory chip containing any form of random access memory (RAM) or read only memory (ROM), a floppy disk, a compact disk (CD) ROM, a hard disk drive, a digital video disk (DVD), a flash memory card or any other medium for storing digital information. Skilled artisans will recognize that when the controller 214 has one or more of its functions performed by a state machine or logic circuitry, the memory 216 containing the corresponding operational instructions may be embedded within the state machine or logic circuitry.

In operation, a user activates the trigger 230 to initiate the document capture operation. In one embodiment, the mobile device 100 is operating in continuous mode and does not require a user to activate the trigger 230. In response to the trigger signal, the controller 214 issues a command instructing the camera 202 to capture an image. The camera 202 captures an image by exposing the image and directing the image data to the display 218. Once the image of the document 224 is previewed on the display 218, the controller 214 determines whether any defects in the document 224 exist. In one embodiment, the defects are determined, based in part, on a predetermined document parameter. For example, the predetermined document parameter can be a shape and dimensions of the document 224. The controller 214 can determine whether the shape of the preview image corresponds to the predetermined document parameter. In the event that the shape of the preview image does not correspond to the predetermined document parameter, the controller 214 determines that a defect in the image exists. The controller 214 can propose a procedure to minimize the defect in the image.

The user adjusts the mobile device 100, and hence, the camera 202 in response to the proposed procedure. For example, the user can translate the mobile device 100, tilt the mobile device 100, rotate the mobile device 100, adjust the distance between the mobile device 100 and the document 224, or perform some combination of these procedures. Once the defect is sufficiently minimized, the controller 214 processes the image and stores the image data in the memory 216.

In one embodiment, the processing can include finding a region of interest within the document 224, using a barcode's parameters (its four corners' locations within the image, for example), and other predefined parameters associated with the specification of the capture area, determining the four corners of the image capture area (generally not forming a rectangle in the image, due to perspective distortion), enhancing the image and reformatting the image.

Enhancing the image can include adjusting the contrast of the image, adjusting the skew of the image, adjusting the illumination, or sharpening the image. In one embodiment, the enhancements can be achieved by implementing a filtering scheme. Also, reformatting can include adjusting the size of the image or compressing the pixel density. In some embodiments, the time for processing can exceed fifty milliseconds. After the processing is completed, the image can be displayed, stored, and/or transmitted to a host computer.

Figure 3:
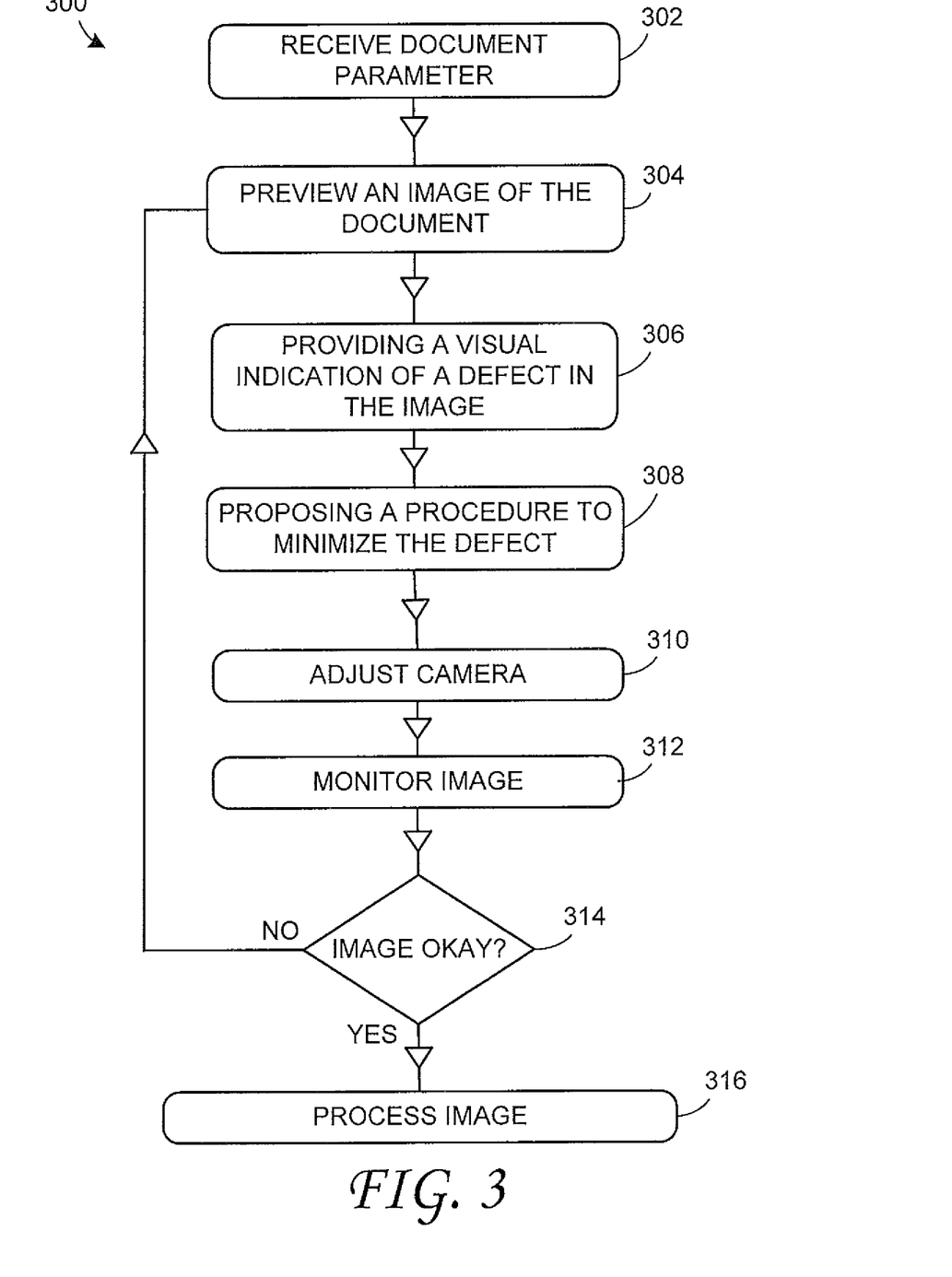
FIG. 3 illustrates a flowchart of a method for capturing an image according to one embodiment of the invention.

FIG. 3 illustrates a flowchart 300 of a method for capturing an image according to one embodiment of the invention. The method includes receiving a predetermined document parameter at a controller 214 (step 302) of the mobile device 200. The predetermined document parameter can be provided by a user, for example.

Next, the image is previewed on a display 218 of the mobile device 100 (step 304). The previewed image is analyzed by the controller 214 to determine whether or not defects exist in the image. For example, the image can be skewed, out of focus, rotated, etc.

The controller 214 provides a visual indication of the defect in the image on the display (step 306). For example, the controller 214 can generate information on the display 218 that indicates the type of defect in the image.

In addition to displaying the image, the controller 214 can propose a procedure to minimize the defect (step 308). For example, the controller 214 can instruct the user take some action to minimize the defect in the image.

In one embodiment, the procedure includes adjusting the camera assembly 200 (step 310). For example, the controller 214 can propose that the user tilts the camera assembly 200 in response to determining that a skew defect exists in the image.

While the user adjusts the camera assembly 200, the controller 214 continuously monitors the image to determine when the defect is sufficiently minimized (step 312). Once the defect is sufficiently minimized (step 314), the controller 214 processes the image (step 316) of the document 224. In one embodiment, the user can define the parameters regarding when a defect is sufficiently minimized and the controller 214 can be programmed with those parameters. For example, the user can determine that a defect that is sufficiently minimized corresponds to a defect which is minimized enough to allow the controller 214 to decode a barcode contained within the document 224. In the event that the defect is not sufficiently minimized, the process is repeated until a suitable image can be captured and processed.

The processing of the image can include removing image skew, improving image contrast and balance illumination across the image. In one embodiment, the user feedback can include a visual or audible notification to the user that the image is being processed. For example, the user can be notified through a display, a light emitting diode (LED), through a loudspeaker, or a combination of these elements. In one embodiment, the user can be notified that the image is being processed by displaying the image in a low-resolution mode prior to completing the processing of the image. In another example, the user can be notified that the image is being processed through an audible signal.

Figure 4:
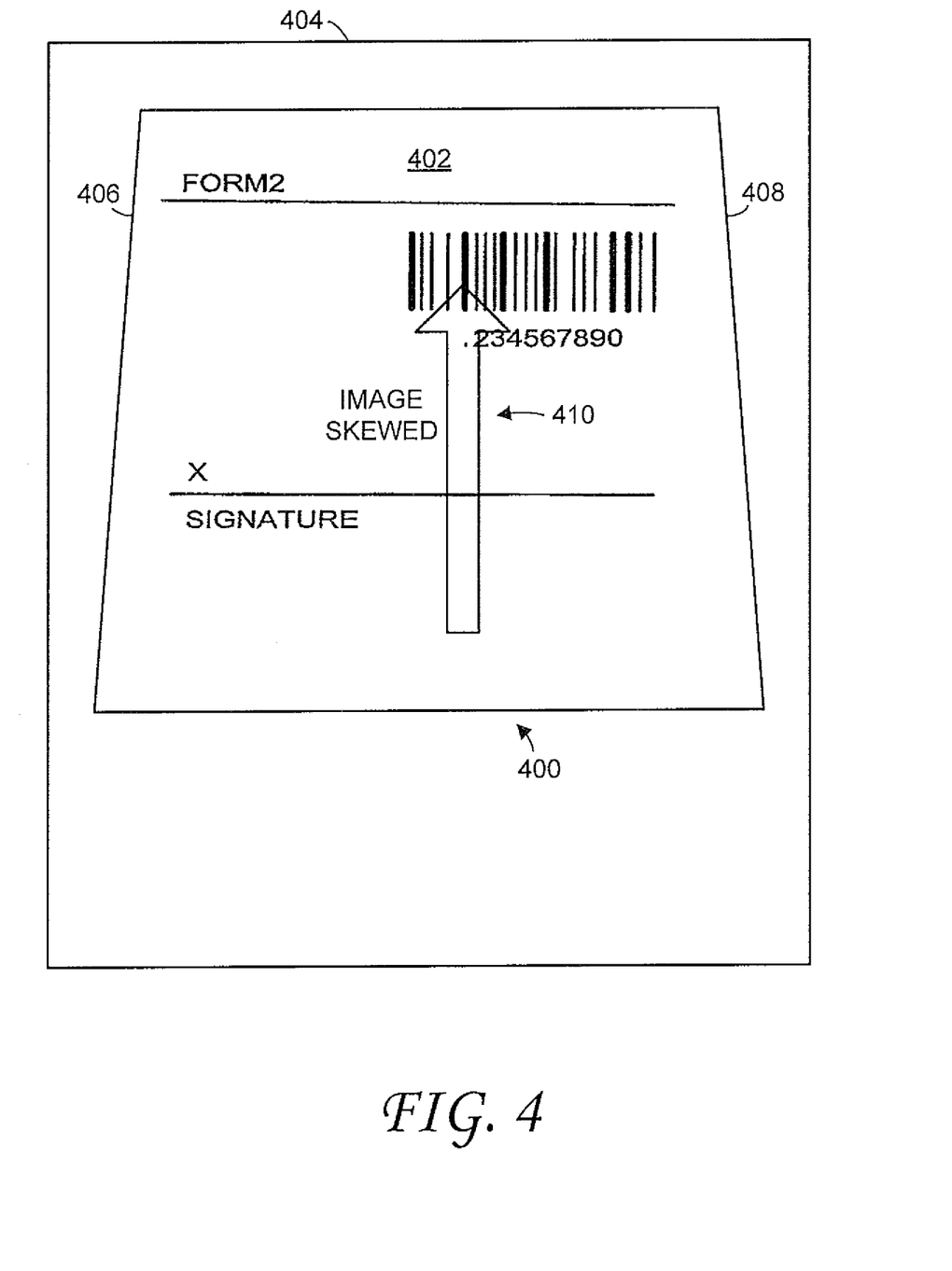
FIG. 4 illustrates an image of a document having a defect according to one embodiment of the invention.

FIG. 4 illustrates an image 400 of a document 402 having a defect according to one embodiment of the invention. In this example, the document 402 appears to be skewed as previewed on the display 404. The predetermined document parameter of the document identifies that the document 402 is rectangular in shape. Thus, the controller 214 (FIG. 2) can determine that the document 402 is skewed because the vertical lines 406, 408 on the edges of the document 402 are not parallel to each other. The controller 214 can also determine the direction of the skew based on the orientation of the edges of the document 402.

The controller 214 previews the image 400 and proposes a procedure to minimize the defect in the image 400 of the document 402. In this example, the controller 214 can propose that the user tilts the camera in order to minimize the skew in the image 400. In one embodiment, the controller 214 generates an overlay 410 to be displayed over a portion of the image 400. The overlay 410 can indicate how a user can adjust the camera assembly 200 to minimize the skew in the image 400.

Figure 5:
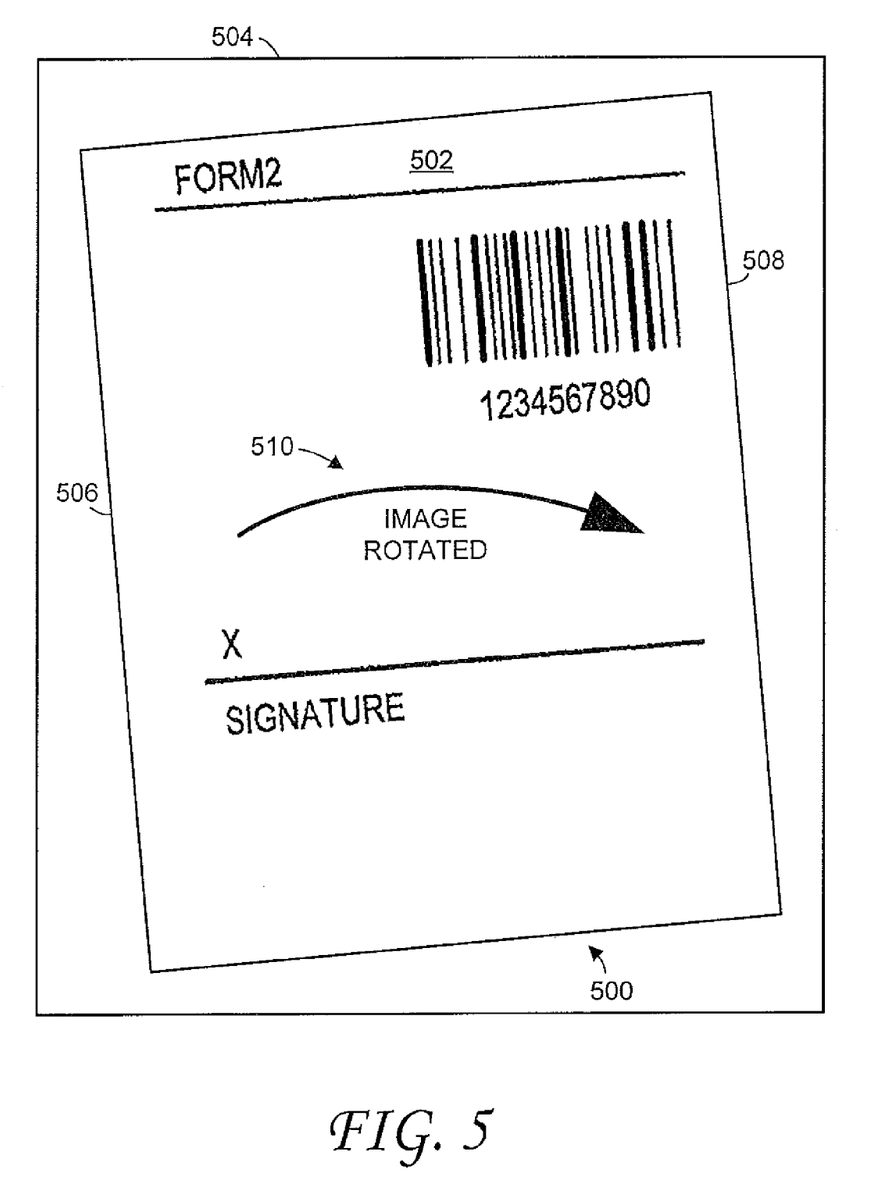
FIG. 5 illustrates an image of a document having another defect according to one embodiment of the invention.

FIG. 5 illustrates an image 500 of a document 502 having another defect according to one embodiment of the invention. In this example, the document 502 appears to be rotated relative to the display 504. The predetermined document parameter of the document 502 identifies that the document 502 is rectangular in shape. Thus, the controller 214 (FIG. 2) can determine that the document 502 is rotated based on the orientation of the edges 506, 508 of the document 502 relative to the display 504. The controller 214 can also determine the direction of the rotation based on the orientation of the edges 506, 508 of the document 502 relative to the display 504.

The controller 214 previews the image 500 and proposes a procedure to minimize the defect in the image 500 of the document 502. In this example, the controller 214 can propose that the user rotates the camera assembly 200 in order to minimize the rotation in the image 500. The controller 214 can generate an overlay 510 that indicates how a user adjusts the camera assembly 200 to minimize the rotation in the image 500.

Figure 6:
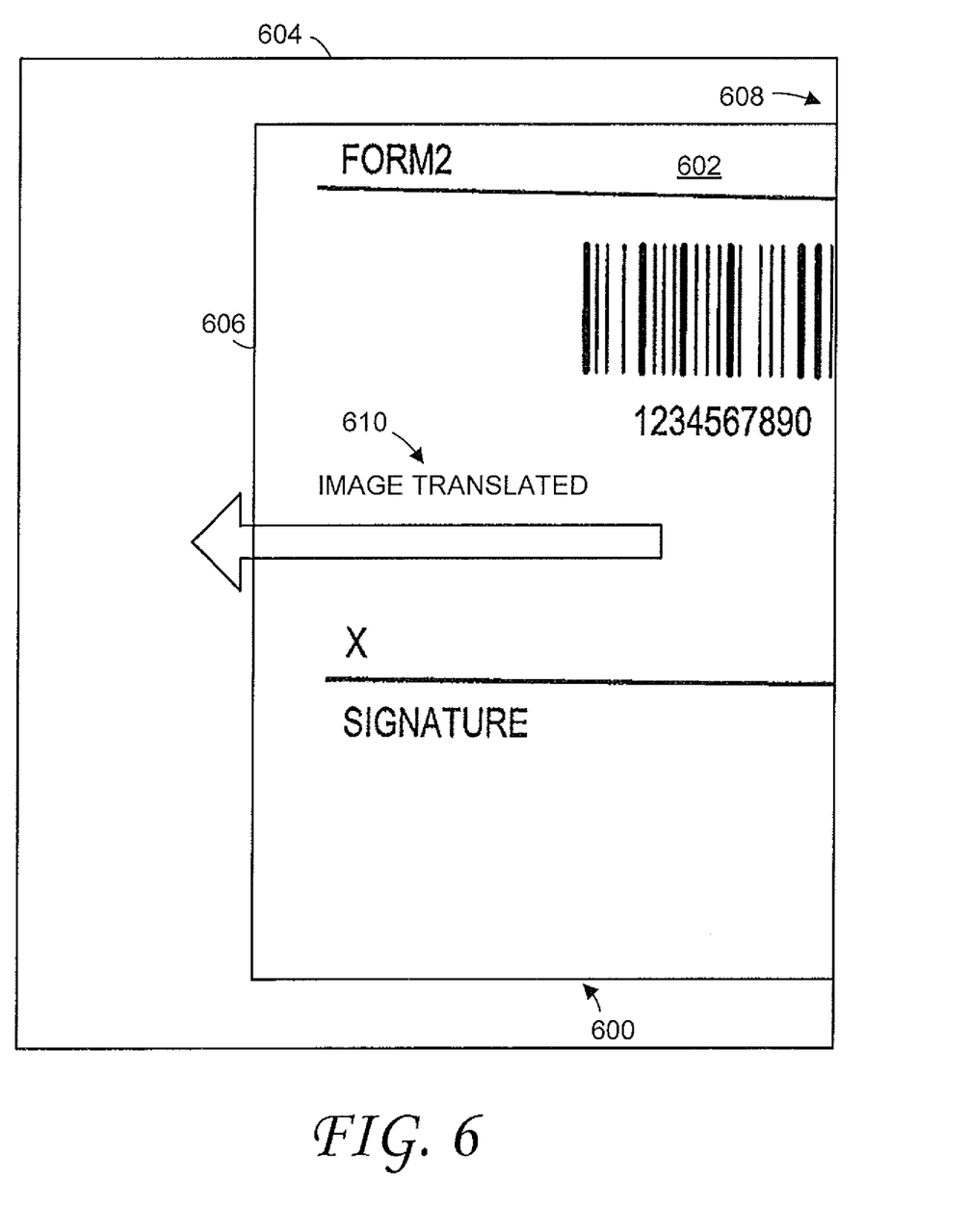
FIG. 6 illustrates an image of a document having another defect according to one embodiment of the invention.

FIG. 6 illustrates an image 600 of a document 602 having another defect according to one embodiment of the invention. In this example, the document 602 appears to be translated to the right. The controller 214 can determine that the document 602 is translated to the right based on the relative sizes of the left and right margins on the display 604. Alternatively, the controller 214 can determine that the left edge 606 of the document 602 appears in the image 600, while the right edge 608 of the document 602 does not appear in the image 600. The controller 214 previews the image 600 and proposes a procedure to minimize the defect in the image 600 of the document 602. In this example, the controller 214 can propose that the user move the camera assembly 200 to the left in order to center the image 600. The controller 214 can generate an overlay 610 that indicates how a user adjusts the camera assembly 200 to minimize the lateral translation of the image 600.

Figure 7:
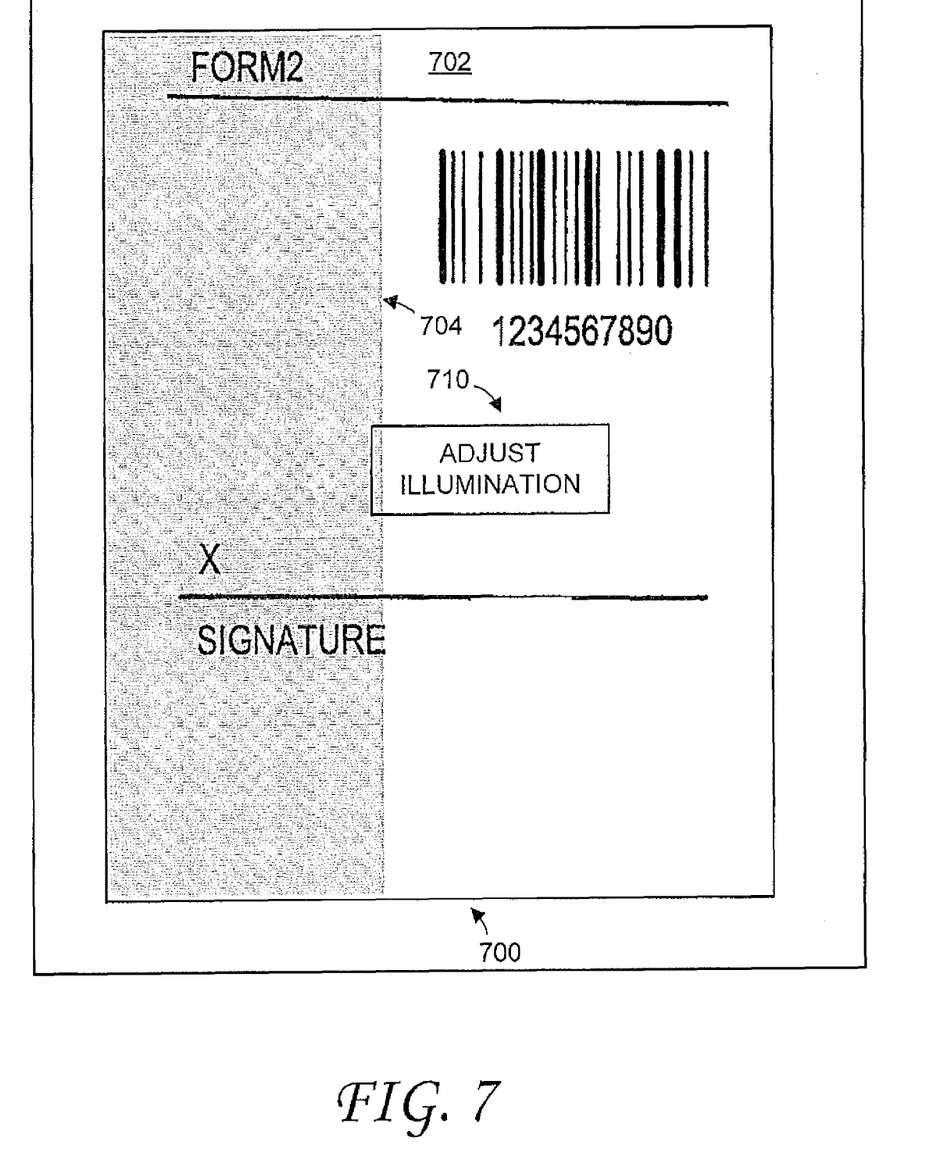
FIG. 7 illustrates an image of a document having yet another defect according to one embodiment of the invention.

FIG. 7 illustrates an image 700 of a document 702 having yet another defect according to one embodiment of the invention. In this example, the image 700 appears to have a dark shadow 704 across a portion of the image 700. The controller 214 can determine that the shadow 704 exists based on the signal received from the camera 202. The controller 214 previews the image 700 and proposes a procedure to minimize the defect in the image 700 of the document 702. In this example, the controller 214 can propose that the user adjust the illumination to improve the uniformity of the illumination. The controller 214 can generate an overlay 710 that indicates how a user can adjust the camera assembly 200 to minimize the shadow 704 in the image 700.

Although this example illustrates a shadow 704 in the image 700, many obstructions that appear on the image 700 can be detected by the camera 202. The controller 214 can propose a procedure to remove the detected obstruction from the image 700.

Figure 8:
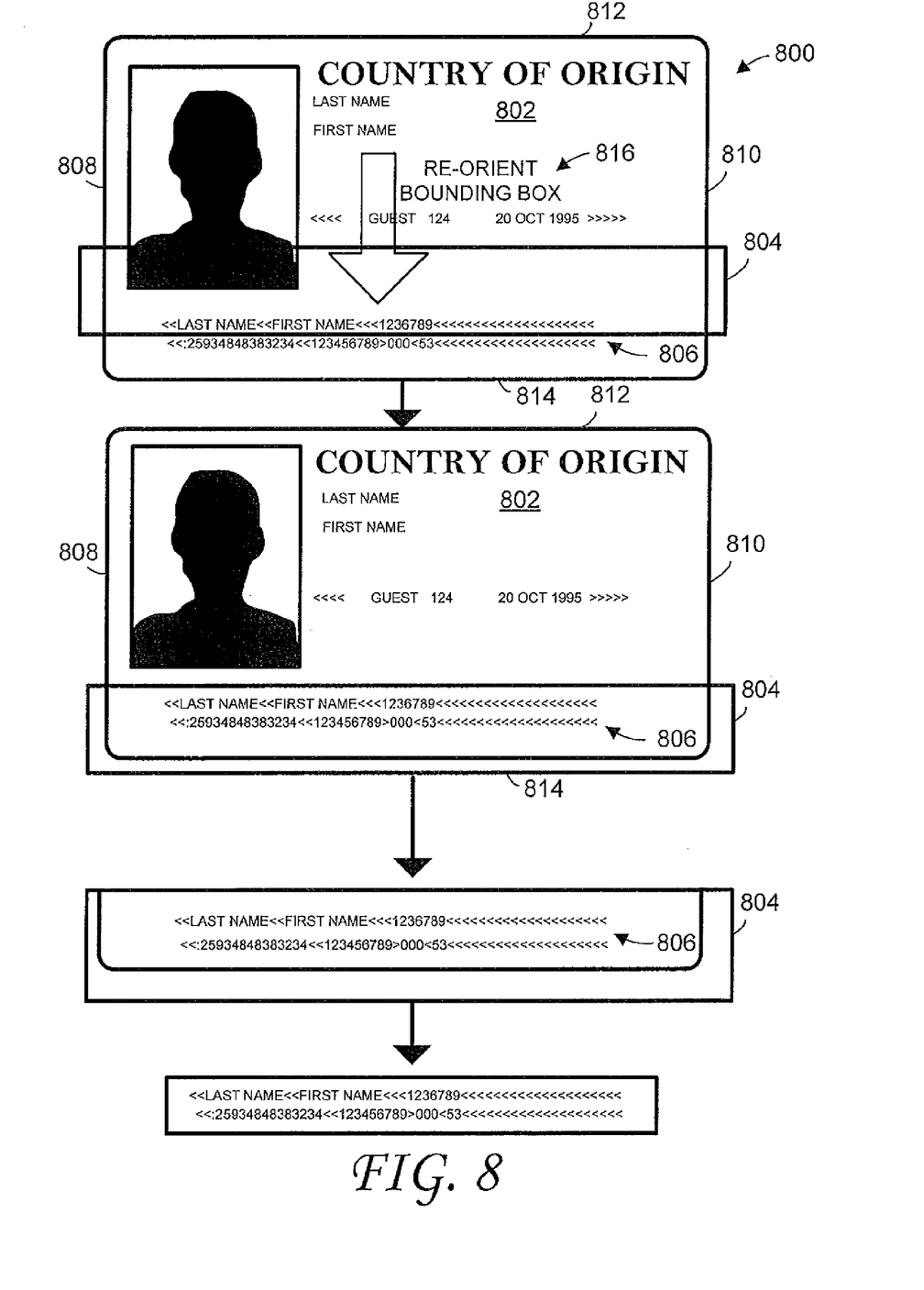
FIG. 8 illustrates an image of a document including a bounding box for selecting a portion of the document according to one embodiment of the invention.

FIG. 8 illustrates an image 800 of a document 802 including a bounding box 804 for selecting a portion 806 of the document 802 according to one embodiment of the invention. The bounding box 804 can be an overlay that is drawn over the desired portion 806 of the image 800 of the document 802. Thus, the bounding box 804 can assist a user to align the camera assembly 200 with the desired portion 806 of the document 802.

In one embodiment, the controller 214 (FIG. 2) can detect that the bounding box 804 is misaligned relative to the image 800 based on the predetermined document parameter. This misalignment constitutes a defect in the image 800. For example, the predetermined document parameter can include the dimensions of the document 802 as well as the location of the desired portion 806 relative to the edges 808, 810, 812, 814 of the document 802. Additionally, the predetermined document parameter can include information regarding the content of the data located within the desired portion 806 of the image 800.

The controller 216 previews the image 800 and proposes a procedure to minimize the defect in the image 800 of the document 802. In this example, the controller 214 can propose that the user translate the camera assembly 200 to align the bounding box 804 with the desired portion 806 of the image 800. The controller 216 can generate an overlay 816 that indicates how a user can adjust the camera assembly 214 to align the bounding box 804. The portion 806 of the image 800 containing the desired data is then captured. The controller 214 can then process the desired data locally and/or remotely, or transmit the image 800 of the desired data to a remote device (not shown) for further processing.

Although this example illustrates a single bounding box 804, it should be noted that any suitable number of bounding boxes can be used. The controller 214 can propose a procedure to align the bounding boxes relative to the image 800, thereby minimizing the defect in the image 800.

In one embodiment, the desired data can be processed using optical character recognition (OCR) to generate text from the data. Positioning the bounding box around the desired data reduces the computation cost and improves the success rate of locating the desired OCR strings compared to processing the complete image using OCR.

In one embodiment, when reading OCR string(s) from a document, such as passport, the user can align the data strings of interest in the bounding box. The bounding box can be adapted or programmed regarding to its size and shape. For example, a user can modify the size and shape of the bounding box by drawing or anchor the corner points of the bounding box on a touch screen using a stylus or a finger.

An image processing algorithm stored in the memory 216 and executed on the controller 214, processes the portion 806 of the image 800 that is in the bounding box 804 to perform image processing, such as image enhancement to improve the contrast of the image 800 prior to decoding the OCR data strings. Since the portion 806 of the image 800 in the bounding box 804 to be processed is much smaller than the entire image 800, the pre-processing requires less time than it would if the entire image 800 were pre-processed. Additionally, the image processing algorithm will not be required to search the entire image 800 to locate the area of interest 806. By spending less time locating the OCR strings, the process of decoding the OCR strings will be much faster and have higher success rates.

In operation, the controller 214 overlays a bounding box 804 on a portion 806 of the image 800 previewed on a display 812. The user can determine how well the document 802 is being aligned from the border of the bounding box 804 on the display 812. The software can automatically capture the desired portion 806 of the image 800 enclosed by the bounding box 804. Alternatively, the user can manually capture the desired portion 806 of the image 800 by activating a trigger.

In one embodiment, the software determines a defect in the alignment of the bounding box 804 and proposes a procedure to the user to optimally align the bounding box 804.

In some embodiments, there can be a number of different formats for the bounding box 804 (e.g., different border rectangle sizes needed for different sizes and types of documents to be captured). In one embodiment, if the selected bounding box is inappropriate for the document being imaged, the user can choose a different bounding box through a user interface or a software setting.

In one embodiment, if the software detects that the document to be imaged is larger than the bounding box, a message can flash on the screen alerting the user that the field of view to be captured is too small with respect to the document being imaged, and allow the user to select a different size bounding box. Alternatively, upon automatic recognition of a specific form type, the software can choose a bounding box having the appropriate size and shape to capture the desired region.

Additionally, for specific forms that include a number of sub-fields of various types, smaller bounding boxes within a main bounding box can be overlaid, such that the user can visually ensure that each sub field is properly aligned. These sub fields can include a barcode for decode, an address field for OCR, a signature for signature capture, etc. Also, the software can automatically detect if a required sub field has been left blank, or inappropriately filled out, and alert the user. For example, in a document with structured sub-fields, a blank field could be highlighted. Additionally, data provided in the field having an inappropriate format can also be highlighted. For example, if a digit was missing from, or extra digit added to, a social security number, or a credit card number, or a phone number, the context sensitive error can be highlighted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It In general, the processor includes processing logic configured to carry out the functions, techniques, and processing tasks associated with the operation of the data capture device. Furthermore, the steps of a method or algorithm described in connection with the embodiments disclosed herein may be embodied directly in hardware, in firmware, in a software module executed by the processor, or any combination thereof. Any such software may be implemented as low level instructions (assembly code, machine code, etc.) or as higher-level interpreted or compiled software code (e.g., C, C++, Objective-C, Java, Python, etc.).

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A method for processing an image of a document, the method comprising:
   receiving, by a controller, at least one predetermined document parameter of the document;
   previewing, by the controller, an image of the document on a display using a camera;
   providing, by the controller, a visual indication of the defect in the image based on the preview;
   proposing, by the controller, a procedure to minimize the defect in the image;
   continuously monitoring the image, by the controller, to determine when the defect is sufficiently minimized; and
   processing, by the controller, the image of the document in response to determining that the defect is sufficiently minimized.

2. The method of claim 1, wherein the procedure is chosen from the group comprising tilting the camera, translating the camera, refocusing the camera, rotating the camera, changing the distance between the camera and the document, adjusting an illumination, adjusting a contrast of the camera, adjusting an exposure of the camera, and removing a visible obstruction from a field of view of the camera.

3. The method of claim 1 wherein the defect is chosen from the group comprising image skew, image out-of-focus, image translated, image rotated, image obstructed, image improperly illuminated, and bounding box misaligned.

4. The method of claim 1, further comprising capturing the image of the document.

5. The method of claim 1, wherein processing the image comprises performing optical character recognition on the image.

6. The method of claim 1, wherein processing the image comprises decoding a barcode present in the image.

7. The method of claim 1, further comprising viewing the image on a display.

8. The method of claim 7, wherein the procedure comprises overlaying a bounding box over the image displayed on the display and adjusting the camera until a desired portion of the document aligns with the bounding box.

9. The method of claim 7, wherein the procedure comprises overlaying a plurality of bounding boxes on the image displayed on the display and adjusting the camera until a corresponding plurality of portions of the document align with the plurality of bounding boxes.

10. The method of claim 7, wherein the procedure comprises overlaying a directional arrow on the image to indicate to the user which direction to move the camera.

11. The method of claim 1, further comprising providing an audio indication of the defect.

12. A mobile device for processing an image of a document, the mobile device comprising:
    a memory storing at least one predetermined document parameter of the document;
    a camera providing an image of a document;
    a processor coupled to the camera, the processor previewing the image of the document; and
    a display providing a visual indication of the defect in the image based on the preview of the image,
    wherein the processor proposes a procedure to minimize the defect in the image; continuously monitors the image to determine when the defect is sufficiently minimized; and processes the image of the document upon a user adjusting the camera in response to the proposal in response to the processor determining that the defect is sufficiently minimized.

13. The mobile device of claim 12, wherein the procedure is chosen from the group comprising tilting the camera, translating the camera, refocusing the camera, rotating the camera, changing the distance between the camera and the document, adjusting an illumination, adjusting a contrast of the camera, adjusting an exposure of the camera, and removing a visible obstruction from a field of view of the camera.

14. The mobile device of claim 12 wherein the defect is chosen from the group comprising image skew, image out-of-focus, image translated, image rotated, image obstructed, image improperly illuminated, and bounding box misaligned.

15. The mobile device of claim 12, wherein the processor processes the image by performing optical character recognition on the image.

16. The mobile device of claim 12, wherein the processor processes the image by decoding a barcode present in the image.

17. The mobile device of claim 12, wherein the processor captures the image of the document.

18. The mobile device of claim 12, wherein the display displays the image.

19. The mobile device of claim 18, wherein the procedure comprises the processor overlaying a bounding box over the image displayed on the display and the user adjusting the camera until a desired portion of the document aligns with the bounding box.

20. The mobile device of claim 18, wherein the procedure comprises the processor overlaying a plurality of bounding boxes on the image displayed on the display and the user adjusting the camera until a corresponding plurality of portions of the document align with the plurality of bounding boxes.

21. The mobile device of claim 18, wherein the procedure comprises the processor overlaying a directional arrow on the image to indicate to the user which direction to move the camera.

22. The mobile device of claim 12, further comprising a speaker for providing an audio indication of the defect.

\* \* \* \* \*